United States Patent
Ward et al.

[11] 4,356,791
[45] Nov. 2, 1982

[54] FILTER DEVICE AND FILTER ELEMENT FOR USE THEREIN

[75] Inventors: Elizabeth M. Ward, Maidenhead; Gerald Buckingham, Kettering, both of England

[73] Assignee: The Diversey Corporation, London, England

[21] Appl. No.: 255,262

[22] Filed: Apr. 17, 1981

Related U.S. Application Data

[63] Continuation of Ser. No. 45,855, Jun. 5, 1979, abandoned.

[30] Foreign Application Priority Data

Jun. 6, 1978 [GB] United Kingdom ............... 26380/78

[51] Int. Cl.³ ............................................. A01J 9/02
[52] U.S. Cl. ............................... 119/14.43; 119/14.33; 210/338; 210/445; 210/448
[58] Field of Search ............... 119/14.46, 14.43, 14.33; 210/338, 337, 445, 448, 335

[56] References Cited

U.S. PATENT DOCUMENTS

| | | |
|---|---|---|
| 1,239,975 | 7/1917 | Signor . |
| 1,284,587 | 6/1918 | Bylander . |
| 1,307,677 | 9/1919 | Konkle . |
| 1,372,880 | 3/1921 | Hills . |
| 2,547,797 | 9/1951 | Torrey et al. . |
| 3,139,857 | 7/1964 | Merritt et al. ..................... 119/14.46 |
| 3,349,919 | 10/1967 | Royer et al. ........................ 210/338 |
| 4,087,363 | 5/1978 | Rosemeyer et al. ................ 210/338 |

FOREIGN PATENT DOCUMENTS

| | | |
|---|---|---|
| 10764 | of 1907 | United Kingdom ............... 210/337 |
| 230991 | 4/1925 | United Kingdom . |
| 264104 | 3/1927 | United Kingdom . |
| 343219 | 2/1931 | United Kingdom . |
| 825419 | 4/1959 | United Kingdom . |
| 1270971 | 7/1969 | United Kingdom . |
| 1216016 | 5/1970 | United Kingdom . |
| 1326436 | 8/1973 | United Kingdom ............... 210/338 |
| 1412975 | 11/1975 | United Kingdom ............... 210/338 |

Primary Examiner—Jay N. Eskovitz
Attorney, Agent, or Firm—Browdy and Neimark

[57] ABSTRACT

A filter device for use in a pipeline flow system used in particular, but not essentially in milking installations comprises a filter housing (4,5) containing a plurality of filter elements (1a,1b,1c etc) of decreasing size in the flow direction for successively filtering and particles of decreasing size. Each filter element comprises a first filter mesh (1) and a second and coarser filter mesh (2) serving a support mesh positioned on the downstream side of each filter element. The support meshes are all coarser than the coarsest filter mesh. Such an arrangement is readily dismantable for cleaning, is resistant to the usual pressures in pipeline flow systems so that filter meshes as fine as 50μ do not rupture and permits a high liquid throughput especially when woven plastics filament meshes are employed.

7 Claims, 4 Drawing Figures

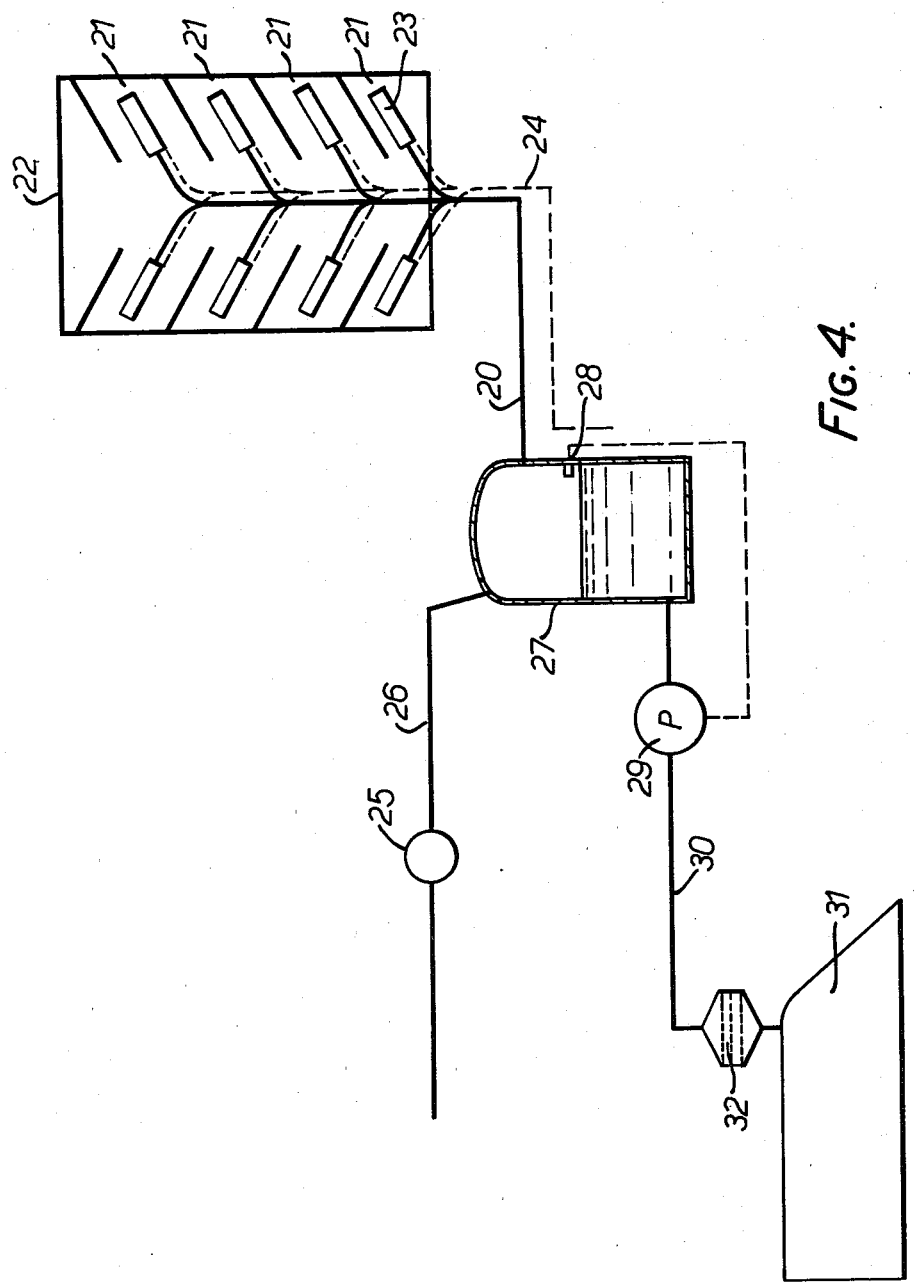

FILTER DEVICE AND FILTER ELEMENT FOR USE THEREIN

This is a continuation of application Ser. No. 045,855 filed June 5, 1979, now abandoned.

This invention relates to multistage filters, particularly, but not exclusively, for use in milk filters and waste water treatment, and to filter elements for use therein.

In water treatment plant and pipeline milking installations, as with many types of plant in which fluids are filtered, efficient operation is maintained by pumping the fluid through the pipes under pressure. It is generally necessary to employ filters sufficiently fine to ensure that a liquid undergoing filtration is free from sediment. In the case of milk, the particle size of the sediments may vary considerably, to some extent depending upon the particulate matter ingested by cows when grazing. However, not only such coarse or gritty solids in milk must be removed therefrom, but generally in order to meet current requirements, it is necessary for organic sediment down to a particle size of as little as 50 microns to be removed from the milk.

Milk filtering arrangements which allow straining of milk to occur by passage through sieves of progressively decreasing mesh size have long been known. For example, a milk straining funnel is disclosed in U.S. Pat. No. 1,307,677. This comprises a first and coarsest sieve fixedly held in the mouth of the funnel with further sieves forming part of inner and outer sleeves being detachably attached to the neck of the funnel. This arrangement is intended for use in unmechanized dairies where the amount of milk to be handled is relatively small by present day standards and filtration of milk to be introduced into churns can adequately be coped with by pouring the milk through such funnels. Such funnels have the particular disadvantage of not being readily cleanable because of the overall complexity of construction thereof.

A low capacity strainer is disclosed in U.S. Pat. No. 1,284,587, with straining being achieved by passage of milk from the container through three replaceable filter elements positioned in a funnel forming part of the container. This funnel is only of small cross-section in relation to the capacity of the container and hence only small amounts of liquid can be handled. Moreover, U.S. Pat. No. 1,239,975 discloses a multiple sieve arrangement for straining milk having a connection arrangement for holding the sieves together. The apparatus is cumbersome because each sieve part is in effect a complete sieving funnel in its own right and nevertheless because of the manner in which the arrangement is held together, cleaning of the apparatus will be difficult. The strainer is intended for the pouring of milk therethrough into churns and will therefore be of relatively low capacity and unsuited for use in modern mechanised dairies.

The aforesaid specifications relate to strainers which may have been adequate for use in farms where a small number of cows are kept. However, in modern dairying, it is usual to keep many more cows, for example from 100 to 300 cows, and clearly it would be totally impracticable to carry out manual milking and more particularly manual filtering of milk in order to remove sediment before it is placed in churns for daily collection. Accordingly, it is now the practice for milking to be carried out automatically on a large number of cows standing in bays arranged in herringbone fashion in a milking shed and for the milk withdrawn from the animals to be supplied under vacuum to a weigh jar. Generally a sensor is employed in the weigh jar to activate a pump in an outlet line from the weigh jar to a large supply tank. Such a tank will generally be used to collect milk from the two daily milkings carried out on a farm and is removed from the farm by loading onto a truck such as a tank truck used for industrial liquids in general. A filter such as a sock as aforesaid is usually employed in the line from the weigh jar to the tank.

A problem with such a sock is that it has to be discarded as soon as it becomes sufficiently clogged as to impede liquid flow. The replacement of such socks obviously involves cost and is a time consuming operation.

In addition to being inexpensive and cleanable, it is generally necessary that the filter should be capable of withstanding pressures as high as, for example 2 $kg/cm^2$ when the pump is in operation. This is a particular problem in view of the particularly fine mesh of sieve generally employed to remove particles as small as 50 microns. If filtering down to such small particles is required, together with retention of good throughput of liquid, then it is generally necessary to make the filters of woven synthetic plastic filaments. With metal filter elements or gauzes, as in the aforesaid patent specifications where throughput is not a major problem, throughput capacity generally has to be sacrificed. This will be a particularly significant factor with a mesh as fine as about 50 microns. However, with synthetic plastic meshes, there is the problem that rupture will occur when the meshes are subject to the liquid pressures employed in pipeline milking installations.

Finally, British patent specification No. 343,219 discloses a filter device for use in a pipe through which gasoline is discharged from a service pump and which is intended to offer minimum resistance to the passage of liquid so that there is little or no back pressure upon the pump. This filter comprises a two part outer casing housing therein perforated conical bodies having their bases adjacent, with straining of filtering material being applied to the exterior and interior of the respective said bodies in the flow direction through the filter. Whilst, overall, the filter arrangement may have offered lower resistance to liquid flow than filters for gasoline previously available, nevertheless, the conical members are shown to be perforated over only a minor proportion of their surface area. If a fine mesh fine denier gauze would be employed as filter material thereover, within the filter device itself, the perforated conical bodies would nevertheless offer a substantial resistance to flow compared to the filter materials. As it is, with gasoline, the size of particulate materials to be filtered is generally much greater than that to be found in milk and the relatively large mesh size of filter material which can then be tolerated would perhaps be compatible with the throughput capacity of the perforated conical bodies.

It is an object of the present invention to provide a filter device for use in a pipeline flow system for filtering of milk which enables solid matter to be filtered from milk down to a particle size as small as about 50 microns and which nevertheless is free from tendency to rupture when subject to the pressures generally encountered in pipeline milking installations; it is another object of this invention to provide readily cleanable and replaceable filter elements for use in a filter device for use in a pipeline flow system particularly as employed in dairies.

According to a first aspect of this invention, there is provided a filter device for use in a pipeline flow system, which device comprises a housing having a fluid inlet and a fluid outlet, the housing containing between the fluid inlet and fluid outlet a plurality of filter elements of decreasing mesh size for successively filtering out particles of decreasing size, which filter elements each comprise a first filter mesh, the size of which first filter meshes decrease in the flow direction, and a second and coarser filter mesh serving as a support mesh positioned on the downstream side of each filter element, which support meshes are coarser than the coarsest said first mesh.

According to a second aspect of the invention, there is provided a filter element for use in apparatus for filtering a fluid under pressure, which element comprises a pair of filter meshes connected together at their edges, one mesh being a support mesh for the other and having a larger mesh size than the other mesh.

The material of which the meshes are made may be of metal, for example stainless steel, but particularly insofar as the filtering of milk is concerned, is preferably a plastic material, for example nylon, polypropylene, polystyrene, PTFE or polyester. It is desirable for meshes to be made in one piece, that is to have no seams in the area thereof upon which fluid impinges.

The meshes are advantageously arranged parallel to one another so that fluid impinges first on the filter mesh at which filtration is to take place. The filter element may be arranged so that fluid impinges thereon substantially as right angles to the plane of the meshes. It has hitherto been fluid impact in this direction which has been a particular cause of mesh rupture when employing meshes formed of woven plastics filaments. The meshes are preferably substantially flat, although some dishing thereof may be tolerated. Alternatively, the filter element may have a conical shape, and may be arranged such that fluid impinges tangentially on the curved surface thereof.

A suitable range of mesh sizes for the support mesh is from 250 microns to 950 microns depending on the material used. For example, smaller mesh sizes may be used with a conically shaped filter element in which the filter and support meshes are made of stainless steel. In this latter case, the mesh size of the support mesh may even be as small as 160 microns.

The filter meshes themselves employed in a filter for milk will generally range in size down to a finest mesh size from 40 to 80 microns. With a typical milk filter, the support meshes will have a mesh size of from 250 microns to 950 microns and the filter meshes positioned thereadjacent will have mesh sizes decreasing from about 140 microns at the coarsest filter mesh to 50 or 70 microns at the finest filter mesh. It is possible for a coarser filter mesh of, for example, 200 microns to be employed in addition, in which case a typical filter device will be one having four filter elements each of which has a support mesh having a mesh size of 950 microns and the mesh sizes of the filter meshes respectively having sizes of 200 microns, 140 microns, 106 microns and 50 or 70 microns.

The casing of the filter device is preferably made of injection molded plastic material for reasons of cost, weight and ease of cleaning. The casing is preferably made of transparent or translucent plastic material in which case TPX (a methyl pentene polymer) is preferably employed since it is resistant to the action of hot dilute nitric acid which is a common cleansing medium. Alternatively, polycarbonate plastic may be employed, but this material has a tendency to become cloudy when subjected to cleaning at temperatures above 100° C.

For a better understanding of the present invention and to show how the same may be carried into effect, reference will now be made, by way of example, to the accompanying drawings, in which:

FIG. 4 shows schematically a pipeline flow system incorporating a filter device according to this invention.

Figure 1:
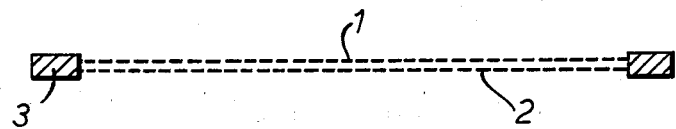
FIG. 1 shows a section through one form of filter element according to the invention.

Referring firstly to FIG. 1, there is shown a cross-section through a flat filter element according to the invention. A filter mesh 1 is disposed on a support mesh 2 of coarser mesh than the filter mesh, and both meshes are enclosed by a reinforcing ring 3. The meshes are of single piece form so that there are no seams in the area in which fluid impinges thereon.

Figure 2:
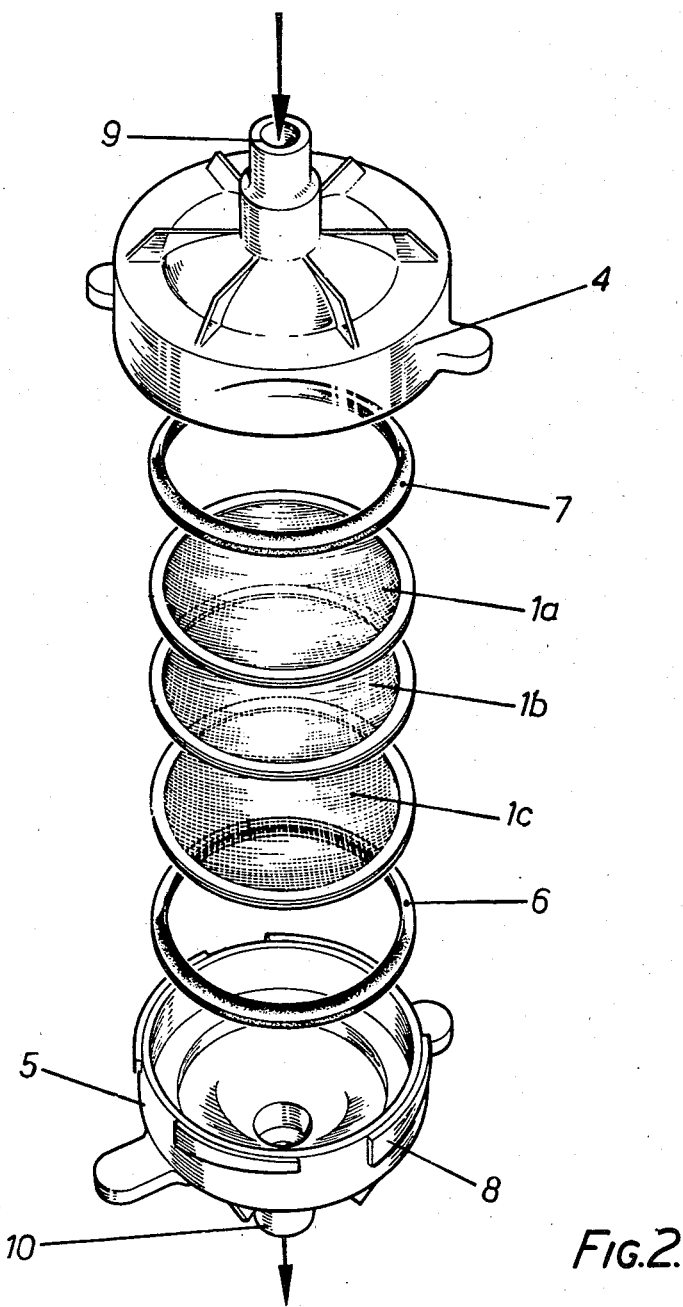
FIG. 2 shows an exploded view of one form of filtration device incorporating three filter elements of the type shown in FIG. 1.

FIG. 2 shows a filtration device incorporating three of the filter elements shown in FIG. 1. This type of apparatus is particularly suitable for use with pipeline milking installations for removing sediment from milk before it is passed to a bulk collection tank, and will be described with reference to this application. The apparatus comprises three filter elements 1a, 1b and 1c, each consisting of a support mesh of mesh size 950 microns and a filter mesh mounted in a reinforcing ring. The three filter elements each have a filter mesh of a different mesh size, the coarsest, 1a, being uppermost. The filter element 1a comprises a filtering mesh having a mesh size of 140 microns, the filter mesh 1b having a mesh size of 106 microns and the filter mesh 1c a mesh size of 50 or 70 microns. The filter elements are all made of nylon as this will withstand the caustic solution usually used for cleaning milking apparatus. The filter elements fit into the lower half 5 of a casing having upper part 4, and matching "foolproof" symbols or color coding will be provided on the reinforcing ring and the casing so that the filter elements may be inserted in the correct order. A rubber seal 6 is provided in the casing 5 to ensure that there is no leakage of milk around the sides of the filter elements. A similar seal 7 is provided in the upper half 4 of the casing. When the filter elements and seals are in position, the two halves of the casing may be screwed together using formations 9 entering corresponding recesses on the casing part 4. The casing is made of a transparent or translucent plastics material such as TPX (a methyl pentene polymer) in order that the operator may from time to time during milking check that the filter elements are not becoming blocked.

The filter elements may easily be removed for cleaning (twice a day in the case of pipeline installations for milk handling). The casing is shaped so as to fit conveniently and securely into the milk inlet aperture on the top of a bulk collection tank for milk with casing inlet 9 uppermost. Milk leaves the filtration device via outlet 10.

Figure 3:
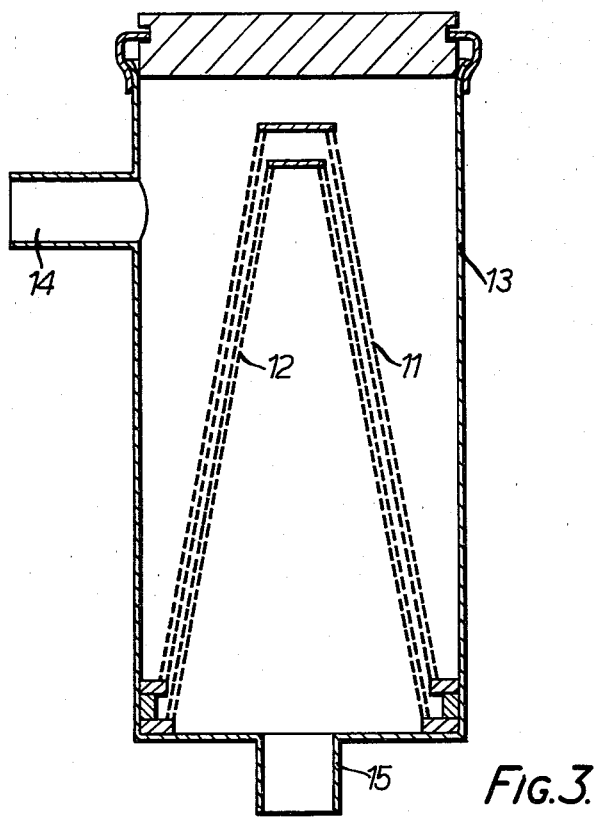
FIG. 3 shows in section another form of filtration device incorporating two filter elements of a different form according to the invention.

Referring to FIG. 3, there is shown a simple filtration device incorporating another form of filter element according to the invention. Two filter elements 11 and 12 having substantially conical shape are shown located in a chamber 13. A fluid inlet 14 is positioned in the chamber such that fluid impinges tangentially on the filter elements, passes through them and leaves the chamber by way of outlet 15. The outer filter element 11 has a filter mesh size of 106 microns, and the inner filter element 12 has a filter mesh size of 50 microns. Both elements have a support mesh size of 106 microns, and all the meshes are made of stainless steel.

As well as flat and conically shaped filter elements, it is also possible to employ dished filter elements.

Finally, referring to FIG. 4 of the accompanying drawings, a pipeline flow system incorporating a filter device embodying this invention, and in particular a filter device of FIGS. 1 and 2 of the drawings, comprises a pipeline 20 from milking bays 21 arranged in herringbone fashion in a milking shed 22, each bay holding an animal 23 shown undergoing milking under the action of an intermittent vacuum applied through a line 24 shown in broken lines. Only eight bays are shown in the milking shed for convenience, but in practice, depending upon the size of herd to be milked, many more bays may be provided on each side of the shed. Removal of milk from milking cups attached to the udders of the animals is effected by means of a vacuum applied at 25 at a point in a line 26 from a weigh jar 27. Alternatively, a pump may be employed for removal of the milk from the cups. The milk accummulates in the weigh jar 27 until the level of milk reaches a sensor 28 which is then actuated to operate a pump 29 in a line 30 from the weigh jar to cause removal of the milk to a storage tank 31 which will generally be sufficiently large to collect all the milk produced by a dairy herd at two milkings, that is the total daily yield. The bulk storage tank 31 will be removed from the site of the dairy daily to a milk processing plant on a truck onto which it will be loaded. A filter 32 embodying this invention is provided in the line 30 for effecting filtering of the milk as the milk passes through the filter element thereof shown in broken lines. The filter device 32 will be a filter device for example of the type shown in FIGS. 1 and 2 of the accompanying drawings and described hereinbefore.

Although the present invention has been described herein primarily with respect to milk filtration, the filter devices of this invention have utility in a wide variety of applications where filtration is needed, including clarification of industrial effluents, in particular from the tanning industry, metal plating industry and electrophoretic painting, in filtering of oil from hydraulic equipment and in filtration of wine in bottling plants. For such purposes, it is frequently desirable for ultra-fine filtration to be effected down to particle sizes of 10μ. Suitable filter meshes for this purpose may be constructed of woven plastic filaments, with sufficient strength being obtained while not unduly compromising throughflow capacity by weaving warp and weft filaments of different thickness.

The number of stages employed in the filter device may also be varied considerably and up to about 12 filter elements with filter meshes ranging in size from as much as 3000μ down to 10μ may be contemplated. In general, the more stages used, the more efficient is the filtering.

We claim:

1. A filter device for use in a pipeline flow system, which device comprises a separable two part housing defining a filter chamber enclosed but for the provision of a fluid inlet and fluid outlet of substantially the same cross sectional area oppositely disposed in end portions of the parts of the housing, the housing containing between the fluid inlet and the fluid outlet a plurality of circular flat filter elements of decreasing mesh size for successively filtering out particles of decreasing size, which filter elements each comprise, set in an annular frame, which frames are clamped in a stack between the end portions of the parts of the housing a first substantially inextensible plastic filter mesh, the size of which filter mesh is decreased in the flow direction down to a finest mesh size of from 40 to 80 microns, and a second and coarser substantially inextensible plastic filter mesh having a mesh size in the range of from 160 to 950 microns and serving as a support mesh positioned on the downstream side of each filter element, which support meshes are coarser than the coarsest said first mesh and which meshes when the filter device is not in use, are generally out of contact with the or each adjacent mesh.

2. A filter device as claimed in claim 1, wherein the said meshes are formed of woven filaments of a plastic material selected from the group consisting of nylon, polypropylene, polystyrene, polyester and PTFE.

3. A filter device as claimed in claim 1, wherein the casing is formed of a methyl pentene polymer.

4. A filter device as claimed in claim 1, wherein the support meshes have a mesh size of from 250 to 950 microns and the filter meshes positioned thereadjacent have mesh sizes decreasing from about 140 to 200 microns at the coarsest filter mesh to about 50 to 70 microns at the finest filter mesh.

5. A milking system for effecting simultaneous milking of a plurality of animals and supply of the milk yield of the animals to a storage tank, which system comprises a weigh jar, a flow system for supply of milk from the animals to the weigh jar and a pipeline from the weigh jar to the storage tank incorporating a supply pump and a filter device, which filter device comprises a separable two part housing defining a filter chamber enclosed but for the provision of a fluid inlet and fluid outlet of substantially the same cross sectional area oppositely disposed in end portions of the parts of the housing, the housing containing between the fluid inlet and the fluid outlet a plurality of circular flat filter elements of decreasing mesh size for successively filtering out particles of decreasing size, which filter elements each comprise, set in an annular frame, which frames are clamped in a stack between the end portions of the parts of the housing, a first substantially inextensible plastic filter mesh, the size of which filter mesh is decreased in the flow direction down to a finest mesh size of from 40 to 80 microns, and a second and coarser substantially inextensible plastic filter mesh having a mesh size in the range of from 160 to 950 microns and serving as a support mesh positioned on the downstream side of each filter element, which support meshes are coarser than the coarsest said first mesh, and which meshes, when the filter element is not in use, are generally out of contact with the or each adjacent mesh, the filter device being disposed in the pipeline with the first mesh of coarsest mesh being upstream and the first mesh of finest mesh being downstream.

6. A milking system as claimed in claim 5, wherein the filter device contains a plurality of substantially flat said filter elements, the filter elements each comprising a pair of filter meshes connected together at their edges, one mesh of each element being a support mesh for the other and having a larger mesh size than the other mesh, the support meshes having a mesh size of from 250 to 950 microns and the filter meshes having a mesh size decreasing from about 140 to about 250 microns at the coarsest filter mesh to about 50 to 70 microns at the finest filter mesh.

7. A milking system as claimed in claim 6, wherein the said meshes are formed of woven filaments formed of plastic material selected from the group consisting of nylon, polypropylene, polystyrene, polyester and PTFE.

* * * * *